United States Patent [19]
Miyano

[11] Patent Number: 5,453,809
[45] Date of Patent: Sep. 26, 1995

[54] ALBADA FINDER

[75] Inventor: Hitoshi Miyano, Saitama, Japan

[73] Assignee: Fuji Photo Optical Co., Ltd., Saitama, Japan

[21] Appl. No.: 305,845

[22] Filed: Sep. 14, 1994

[30] Foreign Application Priority Data

Oct. 13, 1993 [JP] Japan .................. 5-255575

[51] Int. Cl.$^6$ .................. G03B 13/02
[52] U.S. Cl. .................. 354/219
[58] Field of Search .................. 354/219

[56] References Cited

U.S. PATENT DOCUMENTS 3,517,582 6/1970 Pituley.
4,104,663 8/1978 Yamazaki et al..
5,317,451 5/1994 Hasushita.

Primary Examiner—Monroe H. Hayes
Attorney, Agent, or Firm—Sixbey, Friedman, Leedom & Ferguson; Gerald J. Ferguson

[57] ABSTRACT

An Albada finder for a photographic camera consists of an objective lens group having a negative refractive power as a whole and an ocular lens group having a positive refractive power as a whole. The objective lens group is provided with a concave semitransparent mirror surface which is concave toward the ocular lens group. The semitransparent mirror surface is aspherical and the lens faces in the ocular lens group are all spherical. The following formulae (1) and (2) are satisfied, $$0.222 \leq H.\alpha.\beta/2.f \leq 0.346 \quad (1)$$

$$D \geq d.H.\alpha.\beta/f \quad (2)$$

wherein H represents the length of the major side of the exposure area of the camera, $\alpha$ represents the field factor of the finder, $\beta$ represents the magnification of the finder, f represents the focal length of the taking lens of the camera, D represents the effective aperture (as measured in the direction of the major side of the exposure area of the camera) of the lens element closest to the pupil in the ocular lens group, and d represents the eye relief.

2 Claims, 1 Drawing Sheet

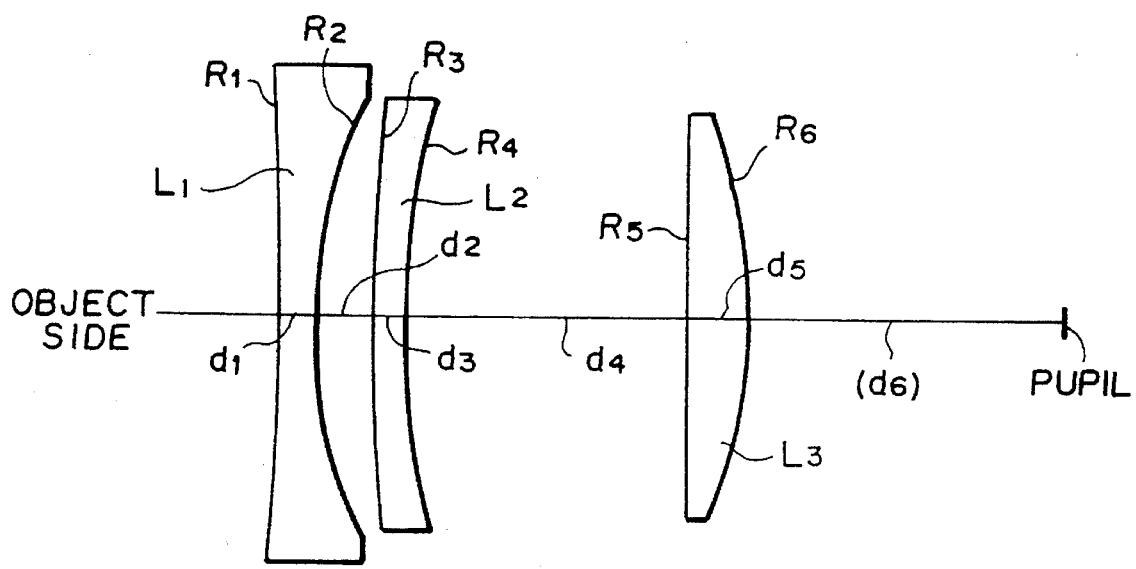

ALBADA FINDER

BACKGROUND OF THE INVENTION

1. Field of the Invention

This invention relates to a viewfinder for a photographic camera, and more particularly to an Albada finder for a compact camera and the like.

2. Description of the Prior Art

There has been known an Albada finder, a virtual image viewfinder for a photographic camera. The Albada finder comprises an objective lens group on the object side and an ocular lens group on the eye side. One face of a lens element in the objective lens group is concave toward the ocular lens group, and the concave face is coated with a multi-layer film of Al, $MgF_2$, ZnS, $SiO_2$ and the like deposited thereon to form a semitransparent mirror. A field frame is formed on a face of a lens element in the ocular lens group facing the objective lens group by depositing thereon metal material such as Al, Ag and the like. Light passing through the objective lens group is reflected by the field frame, is further reflected by the semitransparent mirror and impinges on the eye through the ocular lens group, whereby an image of the field frame is viewed.

If an apparent field of view is narrow when an object is viewed through the finder, the user feels pressure and will have a bad impression on the camera. On the other hand, if the apparent field of view is too wide, it becomes difficult to view the whole field at one time and the user must move the pupil. Accordingly, the apparent field of view should have such an angle that the user will not feel pressure and not have to move the pupil.

Further it is desired that the effective diameter of the eyepiece is large in order to increase the degree of freedom in the position of the pupil, thereby giving the user a feeling of release. Recently as compact cameras have come into wide use, plastic materials come to be wide used as the material for making viewfinders due to their suitability for mass production. Since plastic materials are low in refractive index as compared with glass, aspheric surfaces must be often used in order to correct aberrations. However, when a face in the ocular lens group, especially, the face closest to the eye in the ocular lens group is aspherical, stability of an image viewed through the finder is remarkably deteriorated in response to movement of the pupil since only the optical axis can be an axis of rotational symmetry in the aspheric lenses, which results in fatigue of the user. In the case of a spherical lens, all lines normal to the spherical face can be an axis of rotational symmetry and accordingly spherical lenses are free from such a problem. Thus, it is preferred that the ocular lens group has only spherical faces including a planar face.

In viewfinders, aberrations must be corrected with respect to both an image viewed through the finder (will be referred to as "field system", hereinbelow) and an image of the field frame (will be referred to as "field frame system", hereinbelow). In the Albada finder, when the effective aperture of the ocular lens group is enlarged, aberrations with respect to the field frame system provided in the ocular lens group becomes difficult. That is, though aberrations with respect to the field system can be corrected by providing an aspherical face in the objective lens group, an attempt to correct aberrations with respect to the field frame system by providing an aspherical face in the ocular lens group results in fatigue of the user and deterioration in the value of the camera as described above.

SUMMARY OF THE INVENTION

In view of the foregoing observations and description, the primary object of the present invention is to provide an Albada finder in which the effective aperture of the ocular lens group can be large enough to give the user a feeling of release and aberrations with respect to the field system and the field frame system can consist with each other.

The Albada finder in accordance with the present invention consists of an objective lens group having a negative refractive power as a whole and an ocular lens group having a positive refractive power as a whole and the objective lens group is provided with a concave semitransparent mirror surface which is concave toward the ocular lens group.

The semitransparent mirror surface is aspherical and the lens faces in the ocular lens group are all spherical. The following formulae (1) and (2) are satisfied.

$$.222 \leq H.\alpha.\beta/2.f \leq .346 \qquad (1)$$

$$D \geq d.H.\alpha.\beta/f \qquad (2)$$

wherein H represents the length of the major side of the exposure area (the area to be actually exposed to light when photographing) of the camera, $\alpha$ represents the field factor of the finder, $\beta$ represents the magnification of the finder, f represents the focal length of the taking lens of the camera, D represents the effective aperture (as measured in the direction of the major side of the exposure area of the camera) of the lens element closest to the pupil in the ocular lens group, and d represents the eye relief.

As for the ocular lens group, the term "spherical face" should be interpreted to include a planar face having an infinite radius of curvature.

The semitransparent mirror surface need not be formed over the entire area of the lens face so long as the mirror surface can reflect light from a field frame, formed on a face of a lens element in the ocular lens group facing the objective lens group by depositing thereon metal material such as Al, Ag and the like, to impinge upon the pupil through the ocular lens group.

Though a larger eye relief makes it easier to look in the finder especially when the user wears eye-glasses, a larger effective aperture of the ocular lens group is required as the eye relief becomes larger. Accordingly, when the eye relief is excessively large, it involves a problem in incorporating the finder in the camera. Preferably the eye relief is about 20 mm.

Generally in the case of a reflective surface, a higher surface accuracy is required as compared with a refractive surface. Accordingly, it is not preferred that an aspheric surface having an aspheric factor of a high degree is used as the aspheric semitransparent mirror surface. Further since the image plane is apt to tilt toward the object side due to positive refractive powers of the ocular lens group and the semitransparent mirror surface and at the same time, the field frame is linear, correction in the tangential direction is especially important. Accordingly, it is preferred that the radius of curvature of the concave semitransparent mirror surface be increased as the distance from the optical axis increases.

The formula (1) is for limiting the range of the angle $\Theta$ of apparent field of view in the horizontal direction in terms of tangent of half of the angle $\Theta$ ($\Theta/2$). The upper limit 0.346 corresponds to tan(40°/2) and the lower limit 0.222 corresponds to tan (25°/2). Preferably the lower limit is 0.268 (=tan 30°/2).

When the formula (1) is satisfied, the angle of apparent field of view in the horizontal direction is within the range of 25° to 40°. When the angle of apparent field of view is in this range, the user does not feel pressure and need not move the pupil. When the angle of apparent field of view is smaller than the lower limit, the user feels pressure and when it is larger than the upper limit, the field of view becomes too wide and the user has to move the pupil. In order to further suppress the pressure the user feels, the angle of apparent field of view is preferably not smaller than 30°.

When the formula (2) is satisfied, the effective aperture of the lens element closest to the pupil in the ocular lens group can be set large, whereby the user get a feeling of release when the user looks in the finder.

Further, in the viewfinder of the present invention, since the lens faces in the ocular lens group are all spherical and any line normal to the lens surface can be an axis of rotational symmetry, the image viewed through the finder is stable even if the user moves the pupil, thereby preventing the user from feeling fatigue.

Further since the surface of the semitransparent mirror in the objective lens group is aspherical, aberrations with respect to the field frame system in the ocular lens group can be corrected when light from the field frame is reflected by the semitransparent mirror, whereby both the aberrations with respect to the field system and the field frame system can be corrected.

BRIEF DESCRIPTION OF A DRAWING

A single figure is a view showing the structure of an Albada finder in accordance with an embodiment of the present invention.

DESCRIPTION OF THE PREFERRED EMBODIMENT

As shown in the single figure, an Albada finder in accordance with an embodiment of the present invention comprises an objective lens group and an ocular lens group arranged in this order from the object side. The objective lens group consists of first and second lens elements $L_1$ and $L_2$ arranged in this order from the object side and has a negative refractive power as a whole. The ocular lens group consists of a single third lens element $L_3$ and has a positive refractive power. The lens face R4 which is the closest to the ocular lens group in the objective lens group is an aspheric semitransparent mirror surface which is concave toward the ocular lens group. The lens surfaces $R_5$ and $R_6$ of the third lens element $L_3$ are both spherical. The Albada finder satisfies the following formulae (1) and (2).

$$.222 \leq H.\alpha.\beta/2.f \leq .346 \quad (1)$$

$$D \geq d.H.\alpha.\beta/f \quad (2)$$

wherein H represents the length of the major side of the exposure area of the camera, α represents the field factor of the finder, β represents the magnification of the finder, f represents the focal length of the taking lens of the camera, D represents the effective aperture (as measured in the direction of the major side of the exposure area of the camera) of the third lens element $L_3$, and d represents the eye relief.

A field frame (not shown) is formed on the face $R_5$ of the third lens element $L_3$ facing the objective lens group by depositing thereon metal material such as Al, Ag and the like. Light passing through the objective lens group is reflected by the field frame, is further reflected by the semitransparent mirror surface $R_4$ and impinges on the eye through the ocular lens group, whereby an image of the field frame is viewed.

The radii of curvature R(mm) of the refractive surfaces, the axial surface separations d (mm) (the central thicknesses of the lenses or the air separations), the refractive indexes $N_d$ for the sodium d-line of the lenses and the Abbe's numbers vd of the lenses of the Albada finder shown in the figure are as shown in table 1. In table 1, the radii of curvature of the refractive surfaces, the axial surface separations, the refractive indexes for the sodium d-line and the Abbe's numbers of the lenses $L_1$ to $L_3$ are designated in order from the object side at $R_1$ to $R_6$, $d_1$ to $d_6$, $n_1$ to $n_3$ and $v_1$ to $v_3$. The numbers in the leftmost column of table 1 correspond to the numbers of the symbols R and d.

TABLE 1

| | $R_i$ | $d_i$ | $n_d$ | vd |
|---|---|---|---|---|
| OBJ | — | — | | |
| 1 | aspheric surface 1 | 2.4 | $n_{d1}$ 1.49023 | $v_1$ 57.4 |
| 2 | 27.051 | 3.6 | | |
| 3 | 127.524 | 2.2 | $n_{d2}$ 1.49023 | $v_2$ 57.4 |
| 4 | aspheric surface 2 | 15.26 | | |
| 5 | infinite | 3.2 | $n_{d3}$ 1.49023 | $v_3$ 57.4 |
| 6 | −31.607 | (18.0) | | |

The aspheric surfaces 1 and 2 shown in table 1 are aspheric surfaces having a shape defined by the following formula (3).

$$x = ch^2/[1+\{1-k(c^2h^2)\}^{1/2}] + a_1h^4 + a_2h^6 + a_3h^8 + a_4h^{10} \quad (3)$$

wherein x represents the length of a perpendicular line between a point on an aspheric plane at a height of h above the optical axis and a plane tangent to the aspheric plane at the vertex thereof, h represents the height above the optical axis, c represents the reciprocal of the radius of curvature near the vertex of the aspheric plane, k represents a conic constant, and $a_1$ to $a_4$ respectively represent aspheric coefficients of degree four, degree six, degree eight and degree ten. The values of these coefficients for the aspheric surfaces 1 and 2 are as follows.

aspheric surface 1: c=−0.003955; k=−4.3620×10$^6$; $a_1$=0.0; $a_2$=−1.7246×10$^{-7}$; $a_3$=1.1045×10$^{-9}$; $a^4$=−2.3512×10$^{-12}$ aspheric surface 2: c=0.02064; k=3.4647×10$^{-4}$; $a_1$=−5.5998×10$^{-8}$; $a_2$=0.0; $a_3$=0.0; $a_4$=0.0 H=36.0, α=0.93, β=0.64, f=34.0, D=14.4, d=18.0

In this embodiment, the value of H.α.β/2.f is about 0.315 (Θ=35°) and the value of d.H.α.β/f is about 11.34.

Thus in the Albada finder of this embodiment, the angle of apparent field of view is wide (35°), and accordingly, the user does not feel pressure and need not move the pupil.

Further since the effective aperture of the lens element closest to the pupil in the ocular lens group is large (14.4 mm), the user get a feeling of release when the user looks in the finder.

Further, since the lens faces in the ocular lens group are all spherical and any line normal to the lens surface can be an axis of rotational symmetry, the image viewed through the finder is stable even if the user moves the pupil, thereby preventing the user from feeling fatigue.

Further since the surface of the semitransparent mirror in the objective lens group is aspherical, aberrations with respect to the field frame system in the ocular lens group can be corrected when light from the field frame is reflected by the semitransparent mirror, whereby both the aberrations with respect to the field system and the field frame system can be corrected.

What is claimed is;

1. An Albada finder for a photographic camera consisting of an objective lens group having a negative refractive power as a whole and an ocular lens group having a positive refractive power as a whole, the objective lens group being provided with a concave semitransparent mirror surface which is concave toward the ocular lens group, characterized in that said semitransparent mirror surface is aspherical, the lens faces in the ocular lens group are all spherical, and the following formulae (1) and (2) are satisfied, $$.222 \leq H.\alpha.\beta/2.f \leq .346 \tag{1}$$

$$D \geq d.H.\alpha.\beta/f \tag{2}$$

wherein H represents the length of the major side of the exposure area of the camera, $\alpha$ represents the field factor of the finder, $\beta$ represents the magnification of the finder, f represents the focal length of the taking lens of the camera, D represents the effective aperture (as measured in the direction of the major side of the exposure area of the camera) of the lens element closest to the pupil in the ocular lens group, and d represents the eye relief.

2. An Albada finder as defined in claim 1 in which formula $0.268 \leq H.\alpha.\beta/2.f \leq 0.346$ is further satisfied.

* * * * *